US012056773B2

(12) United States Patent
Conde et al.

(10) Patent No.: US 12,056,773 B2
(45) Date of Patent: Aug. 6, 2024

(54) SYSTEMS AND METHODS FOR COMPUTERIZED LOSS SCENARIO MODELING AND DATA ANALYTICS

(71) Applicant: Insurance Services Office, Inc., Jersey City, NJ (US)

(72) Inventors: Rafael Conde, Jersey City, NJ (US); Douglas Townsend, Wantagh, NY (US); Jim Hulett, St. Pete, FL (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/825,627

(22) Filed: May 26, 2022

(65) Prior Publication Data
US 2022/0383422 A1    Dec. 1, 2022

Related U.S. Application Data
(60) Provisional application No. 63/193,170, filed on May 26, 2021.

(51) Int. Cl.
  *G06Q 40/08*    (2012.01)
  *G06Q 10/0635*  (2023.01)

(52) U.S. Cl.
  CPC ......... *G06Q 40/08* (2013.01); *G06Q 10/0635* (2013.01)

(58) Field of Classification Search
  CPC ............................ G06Q 40/08; G06Q 10/0635
  USPC ....................................................... 705/3–44
  See application file for complete search history.

(56) References Cited

U.S. PATENT DOCUMENTS

| 11,544,266 | B1 * | 1/2023 | Kapoor | G06F 16/248 |
| 2004/0093242 | A1 * | 5/2004 | Cadigan | G06Q 40/08 |
| | | | | 705/4 |
| 2009/0234710 | A1 * | 9/2009 | Belgaied Hassine | |
| | | | | G06Q 30/0201 |
| | | | | 705/7.29 |
| 2016/0379309 | A1 * | 12/2016 | Shikhare | G06Q 40/08 |
| | | | | 705/4 |
| 2018/0114271 | A1 * | 4/2018 | Jhoney | G06F 11/0751 |

(Continued)

FOREIGN PATENT DOCUMENTS

WO    WO-2019173241 A1 *    9/2019    ......... G06F 16/3329

OTHER PUBLICATIONS

Chopprian, et al., "Mind your business by mining your data", S.A.M. Advanced Management Journal 66.2: 45-51, Society for the Advnacement of Management, Spring (Year: 2001).*

*Primary Examiner* — Frantzy Poinvil
(74) *Attorney, Agent, or Firm* — McCarter & English, LLP

(57) ABSTRACT

Systems and methods for computerized loss scenario modeling and data analytics are provided herein. The systems and methods provide customized claim loss analytics to identify questionable insurance claims that require further investigation and include a database for storing claims data related to one or more loss events, a front-end processor configured to generate a user interface with elements configured to allow a user to select one or more business rules and one or more data points for a custom loss scenario rule, and a primary claims analytics processor in communication with the front-end processor that implements the custom loss scenario rule into a production data flow process, thereby impacting the results of data analytics performed by the primary processor.

20 Claims, 8 Drawing Sheets

(56) References Cited

U.S. PATENT DOCUMENTS

2018/0322584 A1* 11/2018 Crabtree ................ G06N 5/045
2021/0019834 A1* 1/2021 Sanjeevi ................ G06Q 40/08

* cited by examiner

All Loss Scenario Rules — 384

| RULE NUMBERS | LOSS TYPE | LOCATION OF LOSS | LINE OF BUSINESS | RISK RESPONSE | RULE STATUS | ACTION |
|---|---|---|---|---|---|---|
| 142 - The involved party has X or more Workers' Compensation claims in the database, 526 - The claimant was hired less than X days prior to the date of More + | ALL | New York | Workers Compensation | Yes | Draft | ✏ 🗑 380 |
| 127 - This involved party has been involved in X or more hit & run or phantom vehicle accidents, 549 - This involved party has X or more auto related theft More + | ALL | ALL 364 366 | Auto Physical Damage | No | Draft | ✏ 🗑 380 |
| 107 - This loss occurred within X days of the original policy inception date, 125 - This involved party has been involved in X or more hit & run or phantom More + | ALL | ALL | Personal Auto Liability, Personal Auto Combined 368 | No 370 | Draft 372 | ✏ 🗑 380 |

362

Company 378  Audit Log 382  EXPORT DATA

Page Number: 1  Rows per page: 10 ▼  Showing 1 - 3 of 3 Results

FIG. 5 (Cont.)

*ClaimDirector Architect*

Create company specific Loss Scenarios by selecting multiple combinations of rules and other data points.

Create Loss Scenario Rule —416

| | | | | | SEARCH —418 |
|---|---|---|---|---|---|
| NAME | DATE | NUMBER | DESCRIPTION | WEIGHT | COMPANY NAME |
| TN2VK | 12/16/2021 13:36:09 | 7087 | Mold with SIU and NICB | 700 | AMERICAN INSURANCE (X914), USA GROUP More + |
| TN2VK | 12/16/2021 13:14:20 | 7087 | Mold with SIU and NICB | 700 | AMERICAN INSURANCE (X914), USA GROUP More + |
| TN2VK | 12/16/2021 13:10:10 | 7087 | Mold with SIU and NICB | 800 | AMERICAN INSURANCE (X914), USA GROUP More + |
| TN2VK | 12/06/2021 12:27:33 | 7085 | SIU Claim | 700 | USA GROUP (X912), SAFETY INC (X913) More + |
| TN2VK | 12/01/2021 09:09:50 | 7084 | SIU WC | 800 | INSURANCE CLAIMS ASSOCIATES (X910) More + |
| TN2VK | 11/19/2021 08:37:21 | 7082 | WC SIU with Priors | 700 | ADJUSTERS INC (X911), JERSEY FARM BUREAU More + |
| TN2VK | 11/10/2021 12:31:03 | 7081 | Refer To SIU | 750 | AMERICAN INSURANCE (X914), SAFETY INC More + |
| TN2VK | 11/10/2021 12:30:44 | 7081 | Refer To SIU | 750 | AMERICAN INSURANCE (X914), SAFETY INC More + |

FIG. 6

SYSTEMS AND METHODS FOR COMPUTERIZED LOSS SCENARIO MODELING AND DATA ANALYTICS

RELATED APPLICATIONS

This application claims priority to U.S. Provisional Patent Application Ser. No. 63/193,170 filed on May 26, 2021, the entire disclosure of which is hereby expressly incorporated by reference.

BACKGROUND

Technical Field

The present disclosure relates generally to the field of data modeling and analytics. More specifically, the present disclosure relates to systems and methods for computerized loss scenario modeling and data analytics.

Related Art

In today's machine learning and artificial intelligence fields, there is a desire to exploring sophisticated computerized approaches for conducting insurance fraud analytics. For example, neural networks, machine learning, multivariate random forest models, and other techniques are being explored to create modern fraud detection models. These techniques can produce accurate predictive results and detect complex fraud patterns. However, these sophisticated fraud models can also be overly complex and can present practical challenges when operationalized by a special investigation unit (SIU).

Further, high expectations of the sophisticated fraud models can be deflated, and confidence can be lost if only nebulous or unintuitive reasons support a scored claim. Also, an SIU team might have varying degrees of understanding or trust in the advanced predictive models based on its own experiences. Often, the more sophisticated the modeling technique, the more challenging it is to provide understandable fraud scenarios and overall context for end users. This challenge is rooted in the complex nature of advanced analytic techniques and multivariate approaches that make it difficult to surface meaningful reason codes.

Furthermore, a fraud detection model may include data from only an individual insurance carrier and, consequently, can produce thin, incomplete results. This lack of industry data can be especially challenging for analytics linked to loss on newer business. Further still, data scientists using traditional empirical approaches may not consider critical investigative concepts or engage the right business subject matter experts to understand the meaning of analytical output.

Accordingly, what would be desirable, but have not yet been provided, are systems and methods which solve the foregoing and other needs.

SUMMARY

The present disclosure relates to systems and methods for computerized loss scenario modeling and data analytics to identify questionable insurance claims that require further investigation. Specifically, the present disclosure includes systems and methods for providing customized claim loss analytics including a database for storing claims data related to one or more loss events and a front-end processor in communication with the claims database. The front end processor retrieves the claims data from the claims database. The front-end processor also generates a front-end user interface with a plurality of user elements configured to allow a user to select one or more business rules and one or more data points for a custom loss scenario rule and generates the custom loss scenario rule based on the user input. The front-end processor then transmits the custom loss scenario rule to a primary claims analytics processor for implementation into a production data flow process.

According to embodiments of the present disclosure, the primary claims analytics processor retrieves the claims data from the database, determines a propensity score for the claims data, and identifies one or more existing business rules triggered by the claims data. The front-end processor can then retrieve the propensity score for the claims data and the existing triggered business rules from the primary claims analytics processor, which the front end processor can display in the front-end user interface. The existing triggered business rules can then be included in the custom loss scenario rule.

According to further embodiments of the present disclosure, the production data flow process includes applying one or more fraud detection algorithms to detect one or more fraud patterns in the claims data and implementing the custom loss scenario rule into the production data flow process causes the detection of the fraud patterns to be extended.

According to still further embodiments of the present disclosure, the front-end user interface also includes a plurality of user elements that are configured to allow the user to modify or delete a saved custom loss scenario rule.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

Figure 1:
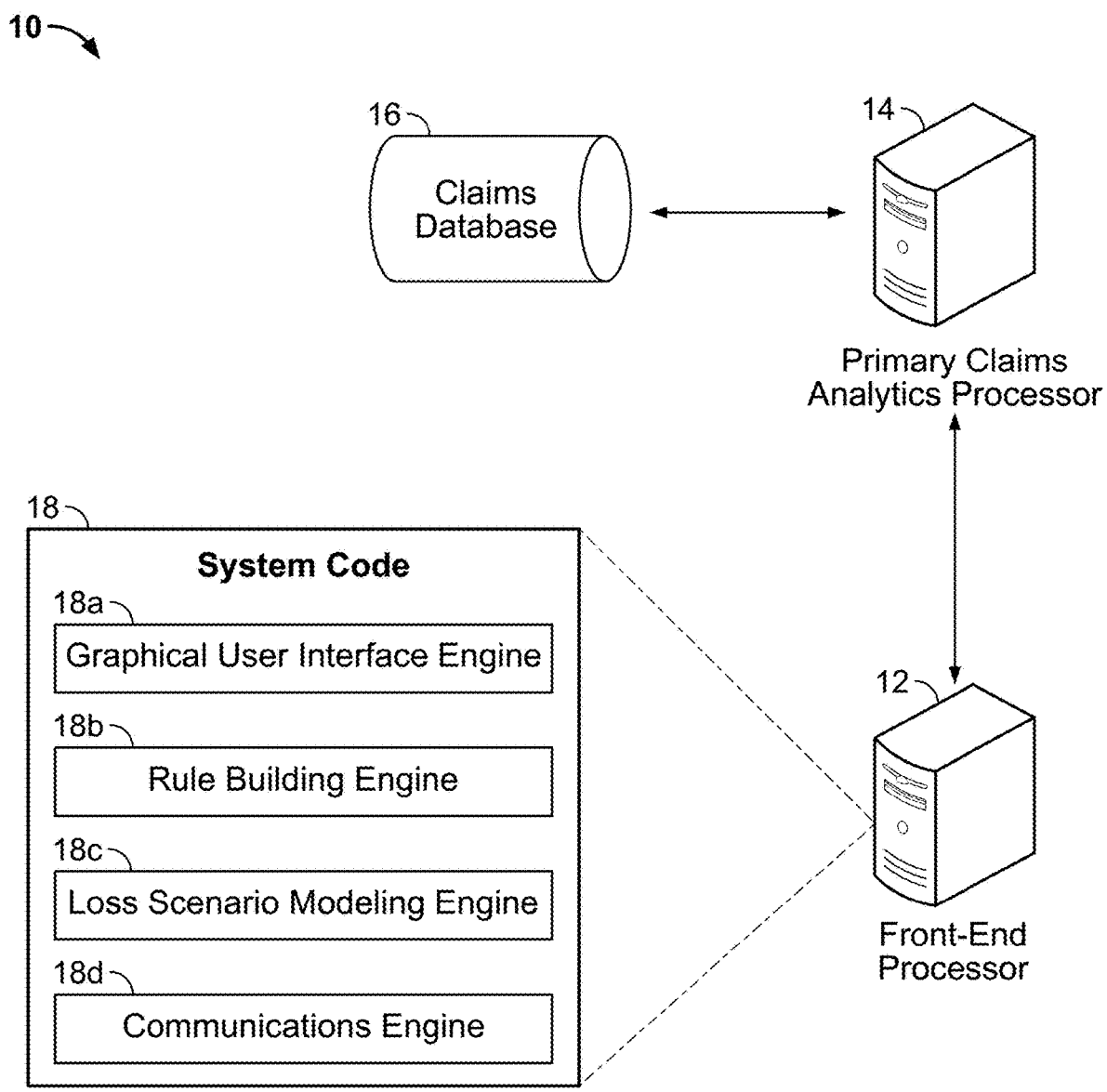
FIG. 1 is a diagram illustrating the system of the present disclosure.

The present disclosure relates to systems and methods for computerized loss scenario modeling and data analytics, as described in detail below in connection with FIGS. 1-6. Specifically, the embodiments described below provide a software-based solution to generate customized analytics that are implemented by a primary claim data analytics system.

The systems and methods of the present disclosure deliver fast, automated, and intuitive questionable claim detection from a first notice of loss throughout the life of a claim. The system can leverage claims data from a plurality of industry data sources (e.g., 1.5 billion industry-wide claims reported by 95% of the P&C industry) as well as third-party data including NICB alerts. The analytics capabilities of the system produce propensity scoring based on the data for all parties, vehicles, address, locations, phone number, and other identifying data discussed herein. The system and methods of the present disclosure also provide customizable, expert business rules, real-time SIU triage capabilities, and business intelligence reporting.

The system provides a sandbox environment where a user can conduct data analytics and can ideate and/or simulate custom rule scenarios from a set of existing business rules and other data points. This provides a mechanism to quickly respond to emerging risks, whatever they may be (disasters, pandemics, etc.). The system provides flexibility to create an efficient, focused, and robust approach for computerized claim fraud detection. Users can also leverage the systems and methods of the present disclosure for internal collaboration with data scientists and analysts to optimize scoring through one or more analytic techniques.

As described herein, the system of the present disclosure is a software-based system that integrates with an existing primary data analytics system. This architecture allows companies to customize the types of analytics available by combining existing analytics and specific data points. These customized analytics can be input into the primary data analytics system to impact the results provided to the end user, assisting the end user in identifying questionable claims that require further investigation.

The systems and methods of the present disclosure utilize business rules to provide the contextual guidance needed to make a complex loss scenario model operational and understandable to SIU users. The business rules also provide key inputs to enhance or complete a loss scenario model and to provide an understanding of questionable loss facts linked to the totality of a claim. More specifically, business rules comprise core data elements that can be combined to create meaningful fraud/loss scenario models. As described herein, a loss scenario is a combination of individual business rules providing a set of facts and circumstances around a loss event. As such, there are thousands of potential business rules that can be combined to create meaningful scenarios across all lines of business and loss types, and a single claim can have multiple fraud scenarios. These scenarios can be adjusted for risks unique to different books of business and interests of SIU subject matter experts.

Accordingly, the systems and methods of the present disclosure allow companies to quickly create customized analytics, which are specific to their company and book of business, thereby improving a company's analytical results within the primary solution. This provides a company with customized analytical results within the primary data analytics system, which are dependent on their own specific needs and book of business.

FIG. 1 is a diagram illustrating hardware and software components capable of being utilized to implement the system 10 of the present disclosure. The system 10 could be embodied as a front-end processor 12 (e.g., a hardware processor) communicatively coupled to a primary claims analytics processor 14 (e.g., a hardware processor), which could be communicatively coupled to claims database 16. The front-end processor 12 executes system code 18 which, when executed, generates a software-based interface that allows a user to create customized analytics (e.g., custom loss scenario rules), in a dashboard software environment, as described in more detail below. The primary claims analytics processor 14 can be an existing primary data analytics system, as described hereinabove. The front-end processor 12 and the primary claims analytics processor 14 could each include, but are not limited to, a personal computer, a laptop computer, a tablet computer, a smart telephone, a server, and/or a cloud-based computing platform.

The system code 18 (i.e., non-transitory, computer-readable instructions) can be stored on a computer-readable medium and is executable by the front-end processor 12 or one or more other computer systems. The code 18 could include various custom-written software modules, or engines, that carry out the steps/processes discussed herein, and could include, but is not limited to, a graphical user interface engine 18a, a rule building engine 18b, a loss scenario modeling engine 18c, and a communications module 18d. The code 18 could be programmed using any suitable programming language including, but not limited to, C, C++, C#, Java, Python, or any other suitable language. Additionally, the code 18 could be distributed across multiple computer systems (e.g., the primary claims analytics processor) in communication with each other over a communications network, and/or stored and executed on a cloud computing platform and remotely accessed by a computer system in communication with the cloud platform. The code 18 could also communicate with the primary claims analytics processor 14 and the claims database 16. The claims database 16 could be stored on the same computer system as the primary claims analytics processor 14, the front-end processor 12, or on one or more other computer systems in communication with the code 18. It should be understood that the front-end processor 12, the primary claims analytics processor 14, the claims database 16, and the system code 18 could all be embodied as a single computer system.

Still further, the system 10 could be embodied as a customized hardware component such as a field-programmable gate array ("FPGA"), application-specific integrated circuit ("ASIC"), embedded system, or other customized hardware component without departing from the spirit or scope of the present disclosure. It should also be understood that FIG. 1 is only one potential configuration, and the system 10 of the present disclosure can be implemented using a number of different configurations.

Figure 2:
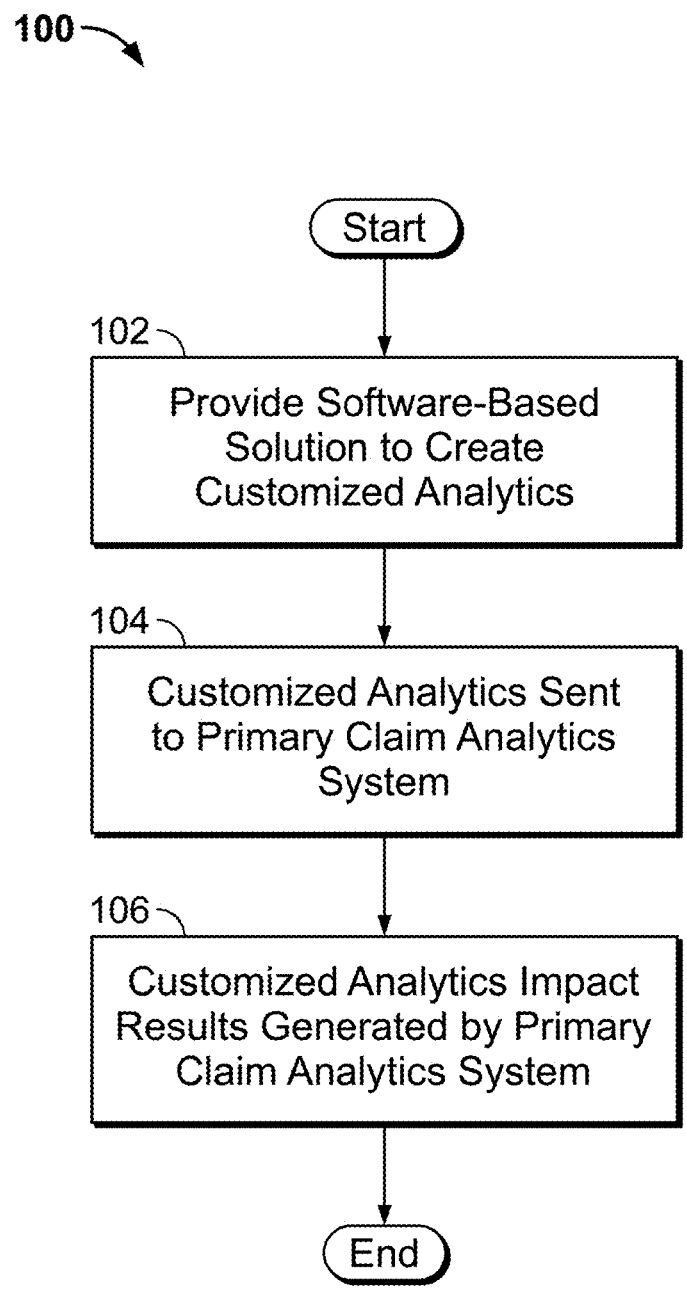
FIG. 2 is a flowchart illustrating overall process steps carried out by the system of the present disclosure.

FIG. 2 is a flowchart illustrating the overall process steps 100 carried out by the system 10 of the present disclosure. In step 102, the system 10 (e.g., the front-end processor 12) provides a software-based solution that allows users to create customized analytics (e.g., custom loss scenario rules). In step 104, the newly created customized analytics are sent to a primary claims analytics system (e.g., the primary claims analytics processor 14). Finally, in step 106, the newly created customized analytics impact the results generated by the primary claims analytics system, thereby enhancing the speed with which data analytics can be carried out.

Figure 3:
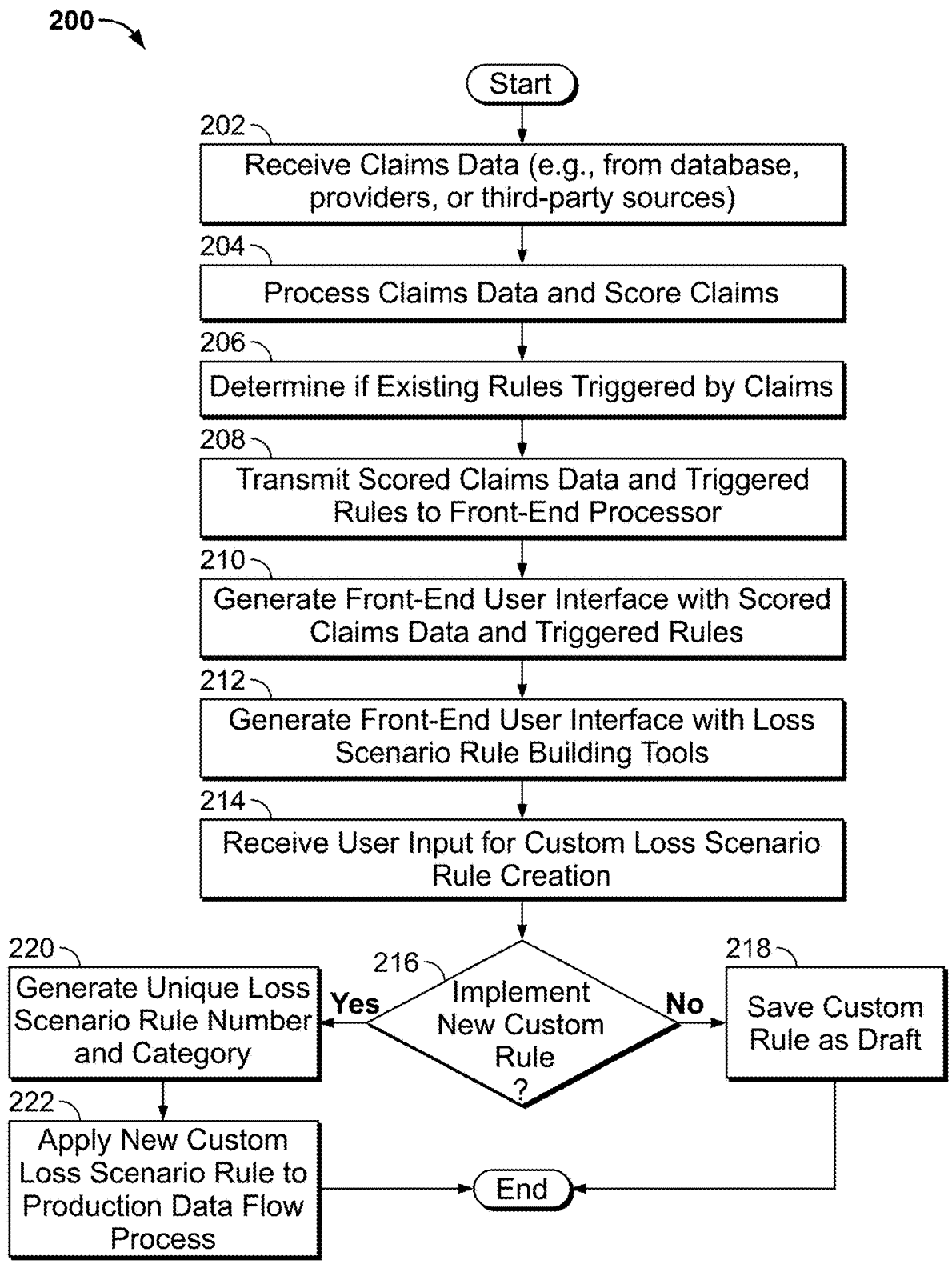
FIG. 3 is another flowchart illustrating additional process steps carried out by the system of the present disclosure.

FIG. 3 is a flowchart illustrating the overall process steps 200 carried out by the system 10 of the present disclosure. In step 202, the system 10 receives claims data from one or more insurance providers or other third-party data sources. For example, in step 202, the system 10 can transmit claims data stored in the claims database 16 to the primary claims analytics processor 14, or the primary claims analytics processor 14 could receive the claims data from one or more computer systems of respective insurance providers over a network connection (e.g., the Internet). According to some embodiments of the present disclosure, the loss scenario information can include a change group name, a company name, a parent company name, an affiliate company name, a unique account subscriber code, any existing business rules applicable to the claim, rule categories, a type of loss, a location of the loss, a date of the loss, and additional data related to the claim. In step 204, the system 10 processes the claims data and applies a score to one or more claims. For example, the primary claims analytics processor 14 can apply one or more scoring algorithms and other data analysis techniques to the claims data to score the claims based on a propensity for fraud.

In step 206, the system 10 determines if any existing rules are triggered by the claims. It should be understood that the one or more scoring algorithms, other data analysis techniques, and existing rules described in connection with steps 204 and 206 can be stored in the claims database 16, or another database in communication with the system 10 of the present disclosure. In step 208, the scored claims data and the triggered existing rules are transmitted to the front-end processor 12.

In step 210, the front-end processor 12 generates a front-end user interface with the scored claims data and the triggered rules. The user interface generated in step 210 can be a dashboard, or the like. According to one example, a user can ideate within the dashboard using "AND" filtering based on the line of business, coverage type, other existing rules or combinations, and other key dynamics to develop a loss scenario that will impact a company's claims scoring results. When the user is ready to build a new custom rule, the process proceeds to step 212, where the front-end processor 12 generates a front-end user interface with rule building tools (referred to herein as "Loss Scenario Creator") for creating one or more custom loss scenario rules. For example, the user can open a loss scenario creator page, discussed in greater detail in connection with FIG. 4, which provides the user with a plurality of tools to select multiple combinations of rules and other data points, provide a custom rule description unique to the user's company or organization, and the like. According to some embodiments, the front-end user interface could be used only for the creation of rules-based scoring algorithms, or it could be extended to include any predictive analytics information from the primary claims analytics system. In step 214, the front-end processor 12 receives user input (e.g., via the front-end user interface) for creating a new custom loss scenario rule. For example, as discussed in greater detail in connection with FIGS. 4-6, the front-end processor 12 can allow a user to define analytics terms in the user interface, including filter terms, and can process the analytics terms at the front-end processor to create one or more custom rules.

In step 216, a determination is made as to whether the new custom loss scenario rule should be implemented. For example, if the user is satisfied with the custom loss scenario rule, the user can export the new custom rule to the primary claims analytics system. Alternatively, if the user is not satisfied, the user can save the new custom rule as a draft. If a negative determination is made in step 216, the process proceeds to step 218, where the system 10 can save (e.g., to the claims database 16) the custom rule as a draft. According to some embodiments, if the user has created a duplicate rule (e.g., based on the data points within the loss scenario), the system can generate an error message informing the user that they are attempting to create a duplicate loss scenario, so that the user can go back and review or edit the loss scenario. If the rule is a unique loss scenario, the rule is saved and a custom loss scenario table (see, e.g., FIG. 5) will be updated with a new row showing the pending rule and data points and the rule status will be shown as "draft." If a positive determination is made in step 216, the process proceeds to step 220, where the system 10 generates a unique rule number for the new custom loss scenario and associates a category with the new custom loss scenario (e.g., "Custom Questionable Loss Scenario"). According to some embodiments of the present disclosure, if the user has created a duplicate rule (e.g., based on the data points within the loss scenario), the system can generate an error message informing the user that they are attempting to create a duplicate loss scenario, so that the user can go back and review or edit the loss scenario. If the rule is a unique loss scenario, the rule is saved and a custom loss scenario table (see, e.g., FIG. 5) will be updated with a new row showing the rule and data points and the rule status will be shown as "in production."

The process then proceeds to step 222, where the system 10 applies the custom loss scenario rule to the production data flow process. For example, the front-end processor 12 can transmit the new custom rule to the primary claims analytics processor 14, where the custom rule is applied to the claims data, along with the existing rules, in order to identify a claim with a propensity for fraud. It should be understood that the primary claims analytics processor 14 will only trigger the new custom rule and show the rule in connection with claims data for the company that created the rule. As described in greater detail in connection with FIGS. 4-6, the new custom loss scenario rule transmitted to the primary claims analytics system can include the following loss scenario information: change group name(s), company name(s), parent company name(s), and affiliate company name(s); unique account subscriber code; single rule number (e.g, between two and five rule numbers); loss type (e.g., one or more); location of loss state (e.g., one or more); line of business (e.g., one or more); loss scenario weight (e.g., 0-999); user generated rule description (e.g., in free text); unique 4 digit code; rule category (e.g., "Custom Questionable Loss Scenario"); and an indication (e.g., yes or no) as to whether to use as part of a proprietary Application Programming Interface (API) to connect to a claim management system.

Figure 4:
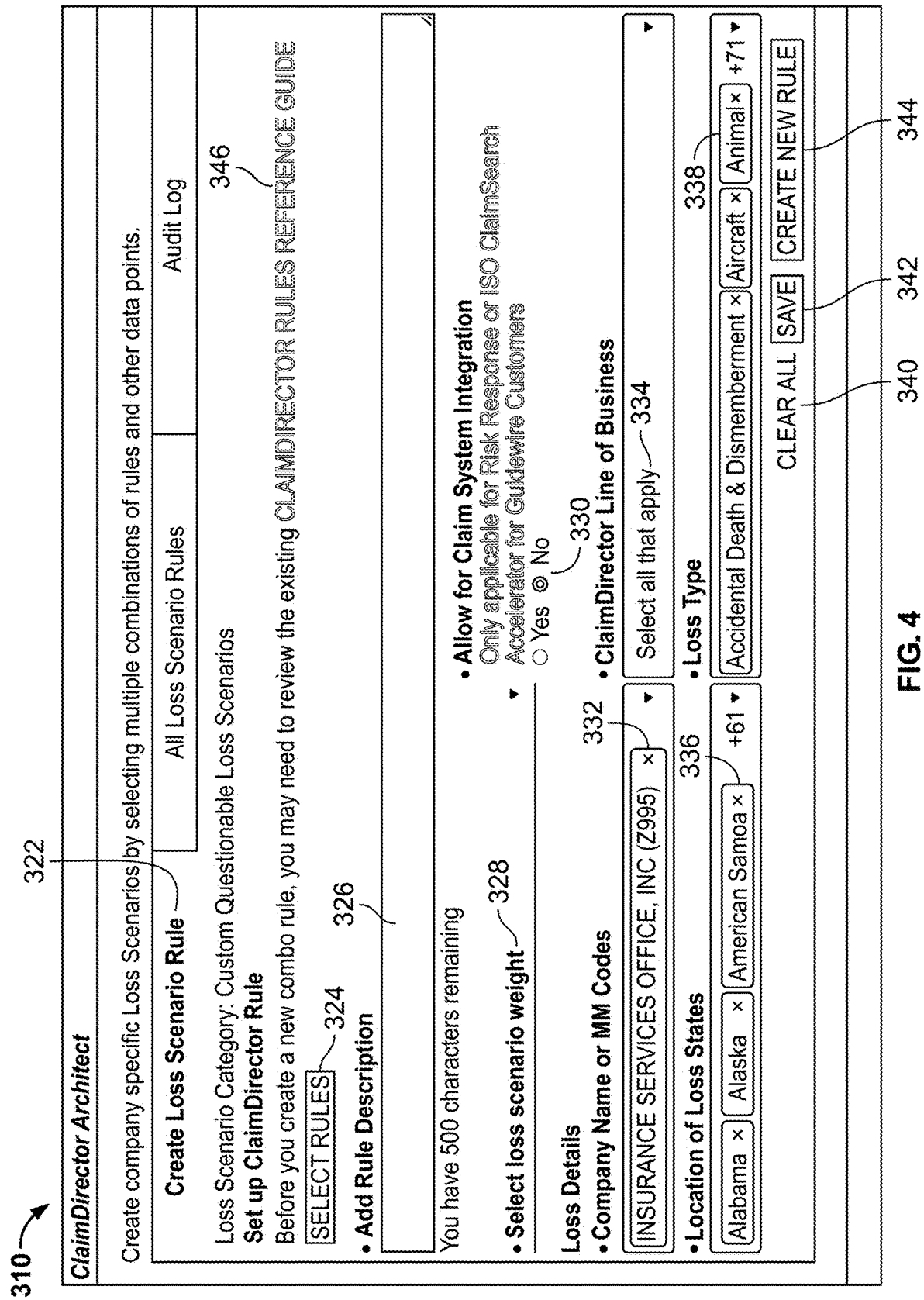
FIG. 4 is a graphical user interface generated by the system of the present disclosure for creating a custom loss scenario rule.
Figure 5:
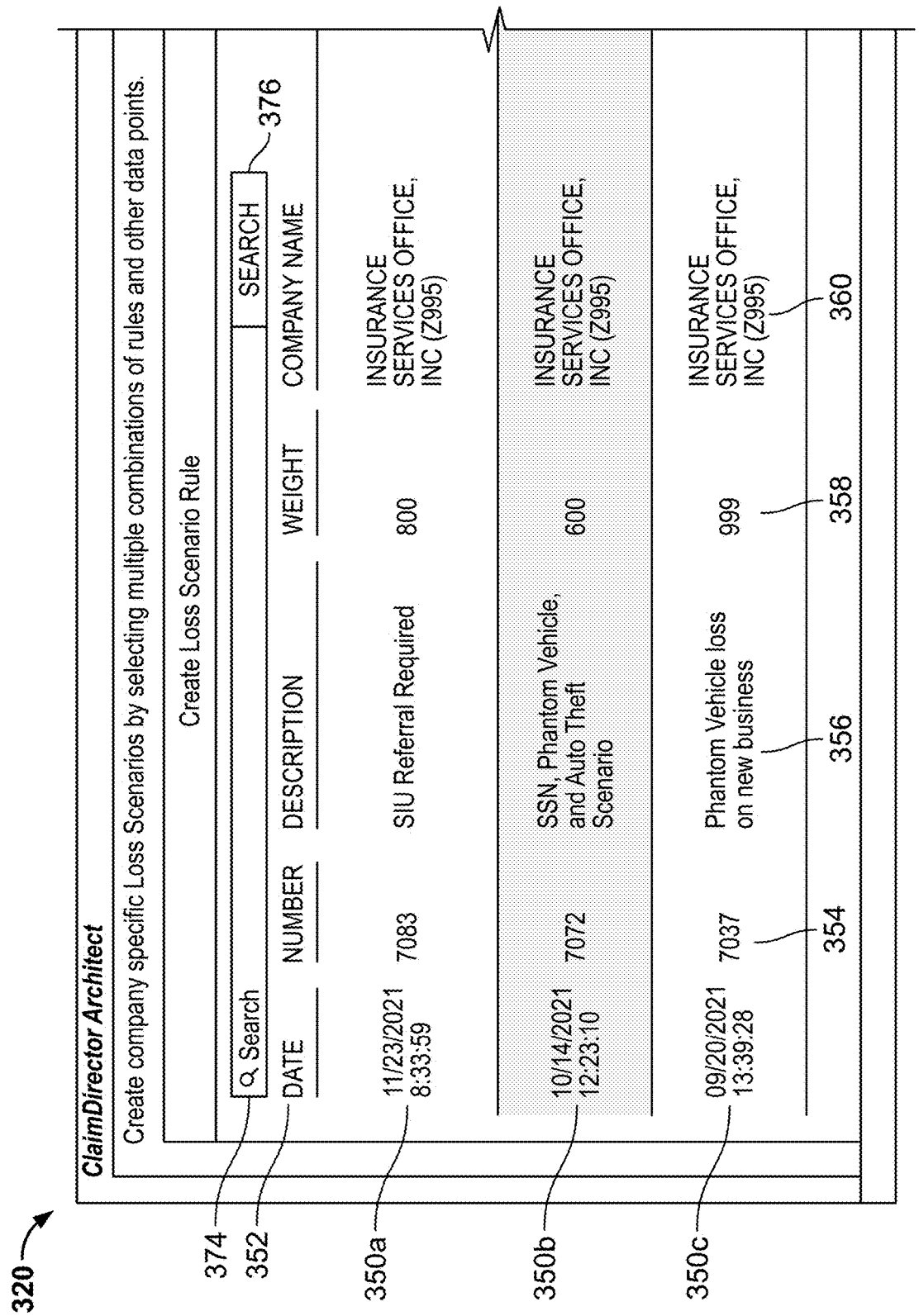
FIG. 5 is another graphical user interface generated by the system of the present disclosure for reviewing one or more custom loss scenario rules.
Figure 6:
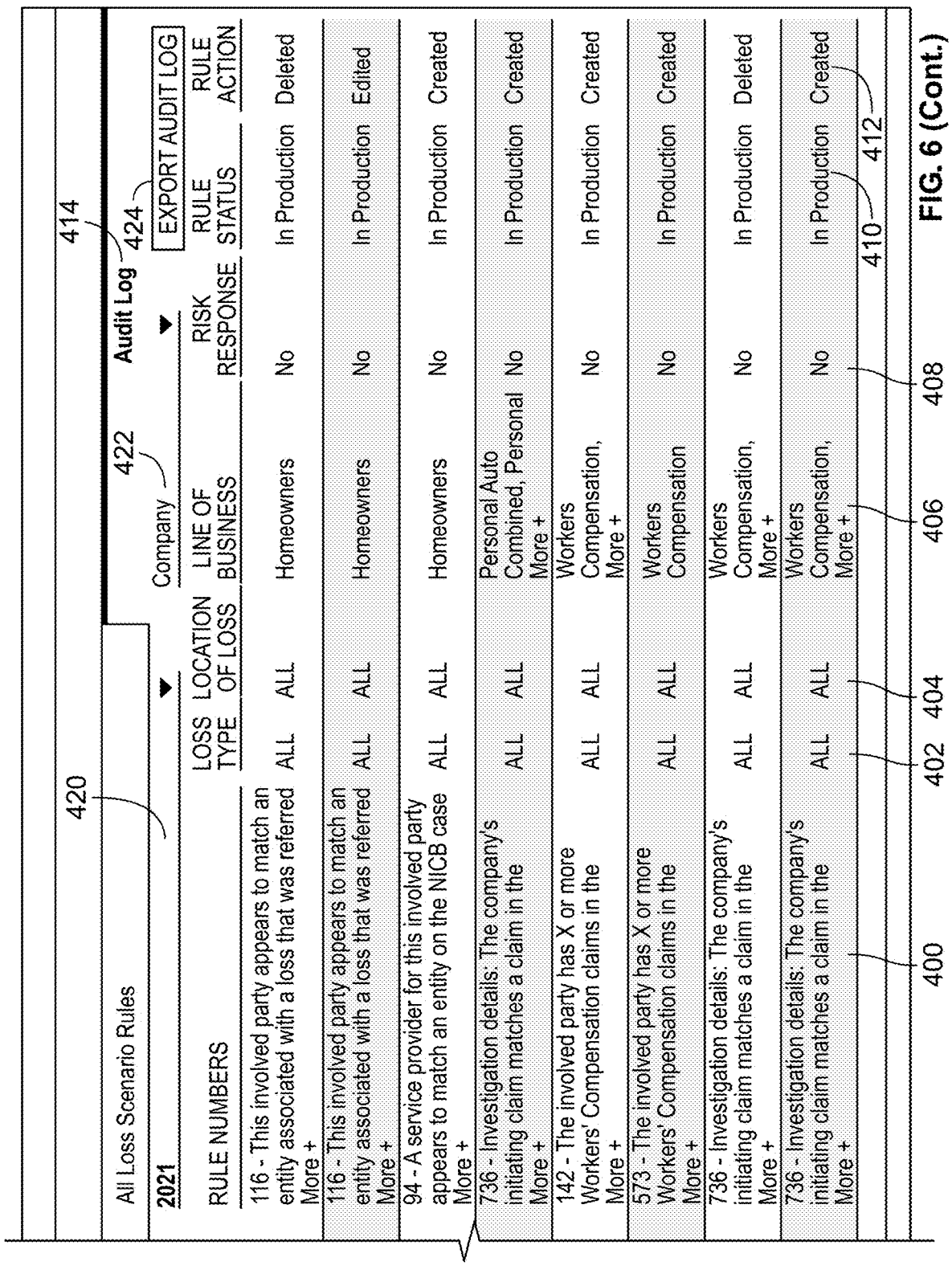
FIG. 6 is another graphical user interface generated by the system of the present disclosure for auditing one or more custom loss scenario rules.

FIGS. 4-6 are user interface screens with rule building tools generated by the system 10 of the present disclosure (referred to herein as "Loss Scenario Creator"), as described, for example, in connection with step 210 of FIG. 3. Specifically, FIG. 4 illustrates a user interface screen 310 for creating custom loss scenario rules, FIG. 5 illustrates a user interface screen 320 for accessing and managing all loss scenario rules modeled by the system 10, and FIG. 6 illustrates a user interface screen 330 for maintaining an audit log relating to modeled loss scenarios. It should be understood that the user interface screens described herein could be embodied as an application running on the front-end processor 12, could be embodied as an application accessible through the primary claims analytics processor 14, or could be embodied as a separate web-based solution. Furthermore, the user interface screens can be embodied as one or more tabs within an application or other interface.

According to some embodiments of the present disclosure, access to the system 10 can be limited based on one or more factors. For example, access to the system 10 could be limited based on a company level or a user level, where the company level indicates if a particular company is subscribed to the system (e.g., Loss Scenario Creator) and where user level access allows a particular user access, create, build, and/or implement custom loss scenario rules.

With particular reference to FIG. 4, the user interface screen 310 for creating custom loss scenario rules allows a user select multiple combinations of rules and data points using drop-down menus and other user interface elements and to provide a custom rule description that is unique to the user's organization. Specifically, the user interface screen 310 includes the following user interface elements and fields: a tab 322 for selecting the user interface screen 310, a rule selection button 324 for selecting one or more existing rules (e.g., to create a combination rule), a rule description input field 326 for naming a new rule, a drop down menu 328 for selecting the loss scenario weight, one or more radio buttons 330 for allowing integration with one or more additional systems, a drop down menu 332 for selecting one or more company names or codes, a drop down menu 334 for selecting a line of business, a drop down menu 336 for selecting the location of one or more loss states, a drop down menu 338 for one or more loss types, a button 340 for clearing all of the user interface elements and fields of the user interface screen 310, a save button 342 for saving a new loss scenario rule to a memory (e.g., the claims database 16), and a button 344 for creating a new loss scenario rule. A link 346, or other user interface element, could be provided which allows the user to access existing loss scenario rules (e.g., a "rules reference guide"). Additionally, a "group" field could be provided, such that if a loss scenario is created at a group level, the loss scenario is applied to all companies and affiliates within the group. According to some embodiments, lines of businesses that a company does not subscribe to could be greyed out or unavailable from within the lines of business drop down element 334.

As such, the user interface 310 allows an end user to select from one or more of the following data points to create a new custom loss scenario rule: existing business rules, affiliate companies, location of loss states, insurance lines of business, and claim loss type. The existing business rules are searchable by rule number or keyword text, and one or more existing business rules can be selected and combined into the new custom modeled scenario rule. The existing business rules can be limited to a rule set that belongs to the company, including any existing rules that the company has previously customized. The user can also create a rule description (e.g., by adding desired text to describe the new custom rule or course of action), can create a custom weighted numeric value (e.g., which determines how the new rule will impact claim scoring), and can integrate the new custom rule with a customer claims management system. The user can then implement the new custom rule in production, or save the rule as a draft. If the user choses to implement the new custom rule, the system 10 creates a new unique custom rule number and adds the new rule to the production data flow process. It should be understood that the new custom rule, when implemented in the production data flow process by the system 10, is only applied to the company of the user that created the new custom rule.

FIG. 5 illustrates the user interface screen 320 for accessing and managing loss scenario rules modeled by the system 10. As can be seen, each of loss scenarios 350*a-c* includes a date (e.g., date loss scenario was created), scenario number, description, a weight value, company name, relevant loss analysis rule numbers applicable to the modeled scenario, types of losses applied, the location of the loss, a line of business, an indication of whether a risk response is warranted (e.g., yes or no), the status of the loss scenario rule (e.g., in production, draft, or failed), and other information, which are displayed in respective columns 352-372. The user interface screen 320 also includes a tab 384 for selecting the user interface screen 320, a search field 374 and button 376 for searching the loss scenario rules, one or more drop down menus or filters 378 for filtering and/or sorting the search results, action buttons 380 for editing or deleting one or more of the loss scenario rules, and an export data button 382. Importantly, the user interface screen 320 provides a real-time, dynamic indication of the current status of modeling (by one or more computing systems) of the loss scenario rules generated by the system, so that the user can see, in real time, modeling progress by such systems. This allows for more efficient computer modeling and better usage of computing resources. For example, if a particular loss scenario rule being modeled takes significant or unacceptable amounts of computer time to complete modeling, or if modeling of the requested rule results in a failure, modeling of that loss scenario rule can be terminated, and a new (more computationally efficient) loss scenario rule could be defined and modeled.

The loss scenario rules shown in the graphical user interface 320 can be limited to the rule set that belongs to a given company, including any rules they have customized. According to some embodiments, user created custom loss scenarios can only be edited through the Loss Scenario Creator. When editing a custom loss scenario, the user may edit any of the data points discussed in connection with the graphical user interface 310 of FIG. 4, with the exception being that the loss scenario number and the loss scenario category will remain fixed. When the edited loss scenario is saved, the edited loss scenario will replace the previous loss scenario and be shown on a new row of the user interface screen 320. It should be understood that loss scenarios that have been transmitted to the primary claims analysis system can also be edited in a similar fashion. In such cases, the edited loss scenario will be sent to the primary claims analysis system for implementation into the production data flow process. Loss custom loss scenarios can also be deleted through a similar process, for example, by clicking on a "delete" user interface element 380 of graphical user interface 320. According to some embodiments, when a rule is deleted, the rule is removed from the graphical user interface 320. However, the rule will continue to be shown in the audit log graphical user interface 330, discussed in connection with FIG. 6. Specifically, the status of the rule can be changed from "in progress" or "draft" to "deleted."

As such, the user interface screen 320 allows the user to view or export all custom rules in production or saved as drafts (e.g., in .pdf or Excel format), allows the user to search active custom rules by any data point or keyword, allows the user to edit data points of previously created custom rules, and allows the user to delete previously created custom rules. The user interface screen 320 also allows the user to sort and view the following data points: date created or updated, custom rule number, custom rule description, custom weighted numeric value, company names selected, existing business rules used for new custom rule, claim loss type(s) selected, location of loss state(s) selected, insurance line(s) of business selected, if option to integrate new custom rule with a customer claims management system is selected, rule status (e.g., in production or draft), and actions (e.g., edit or delete). Thus, the user interface screen 320 interface of FIG. 5 allows for rapid loss scenario creation, data modeling and analytics, and access/management to specific loss scenarios.

FIG. 6 illustrates a user interface screen 330 for maintaining an audit log relating to changes to loss scenario rules. As can be seen, the user interface screen 330 provides information relating to each of modeled loss scenarios 386*a-h*, including the name of the scenario, date, loss scenario number, loss scenario description, weights, company names, rule numbers involved, type of loss, location of loss, lines of business, risk responses, status of the loss scenario rules, and rule actions, which are displayed in respective columns 388-412. The user interface screen 330 also includes a tab 414 for selecting the user interface screen 330, a search field 416 and button 418 for searching the modeled loss scenarios, one or more drop down menus or filters 420 and 422 for filtering and/or sorting the modeled loss scenarios, and a button 424 to export the audit log. For example, drop down 420 can display the audit log for a given time frame (e.g., 7 days, 30 days, 90 days, year to date, or a particular year (2021 shown in FIG. 6)).

When a new loss scenario is created, the following information is saved to the audit log: the name (e.g., full name and/or user ID) of the user who created the loss scenario; the date on which the new loss scenario was created; the loss scenario number; the loss scenario description; and the data point values described in connection FIG. 4. Additionally, when a loss scenario is edited, the original loss scenario is not overwritten in the audit log. Instead, the original loss scenario is preserved with the rule status changed to "edited," and a new entry with the edited loss scenario rule is added to the audit log with the rule status as "in production." It should also be noted that while the data points of the loss scenario rule can be edited, the unique loss scenario rule number and the category assigned by the system 10 remain static fur the purpose of tracking changes to the rules in the audit log. Similarly, when an existing loss scenario is deleted, the loss scenario is not removed from the audit log. Instead, the original loss scenario is preserved with the rule status changed to "deleted."

As such, the user interface screen 330 allows the user to view or export the history of any custom rules created, edited, or deleted by users in their company, allows the user to search history of any custom rules by any data point or keyword, allows the user to select the timeframe of history shown for custom rules, and allows the user to sort and view the following data points: username that created, edited, or deleted custom rule; date custom rule was created, edited, or deleted; custom rule number; custom rule description; custom weighted numeric value; company names selected; existing business rules used for new custom rule; claim loss type(s) selected; location of loss state(s) selected; insurance line(s) of business selected; if option to integrate new custom rule with a customer claims management system is selected; rule status (e.g., in production or draft); and rule action taken (e.g., created, edited, or deleted). The audit log could be stored on the claims database 16, or on a separate database that is accessible by the front-end processor 12.

Having thus described the systems and methods in detail, it is to be understood that the foregoing description is not intended to limit the spirit or scope thereof. It will be understood that the embodiments of the present disclosure described herein are merely exemplary and that a person skilled in the art can make any variations and modifications without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for customized claim loss analytics, comprising:
   a database for storing claims data related to one or more loss events; and
   a front-end processor in communication with the claims database, the front end processor:
      retrieving the claims data from the claims database;
      generating a front-end user interface with a plurality of user elements configured to allow a user to select one or more business rules and one or more data points for a custom loss scenario rule;
      receiving user input related to the selection of the one or more business rules and one or more data points for the custom loss scenario rule;
      generating the custom loss scenario rule based on the user input; and
      transmitting the custom loss scenario rule to a primary claims analytics processor for implementation into a production data flow process, the custom loss scenario rule generated by the front-end processor enhancing speed of data analytics carried out by the primary claims analytics processor.

2. The system of claim 1, wherein the primary claims analytics processor retrieves the claims data from the database.

3. The system of claim 2, wherein the primary claims analytics processor determines a propensity score for the claims data.

4. The system of claim 3, wherein the primary claims analytics processor identifies one or more existing business rules triggered by the claims data.

5. The system of claim 4, wherein the front-end processor retrieves the propensity score for the claims data and the one or more identified existing business rules triggered by the claims data from the primary claims analytics processor.

6. The system of claim 5, wherein the front-end processor displays the propensity score for the claims data and the one or more identified existing business rules triggered by the claims data in the front-end user interface.

7. The system of claim 6, wherein the custom loss scenario rule includes one or more of the identified existing business rules triggered by the claims data.

8. The system of claim 1, wherein the production data flow process includes applying one or more fraud detection algorithms to detect one or more fraud patterns in the claims data.

9. The system of claim 2, wherein implementation of the custom loss scenario rule into the production data flow process caused the detection of the one or more fraud patterns to be altered.

10. The system of claim 1, wherein the front-end user interface includes a plurality of user elements configured to allow the user to modify a saved custom loss scenario rule.

11. A method for customized loss analytics, comprising:
   providing a database for storing claims data related to one or more loss events; and
   providing a front-end processor in communication with the claims database, the front end processor:
      retrieving the claims data from the claims database;
      generating a front-end user interface with a plurality of user elements configured to allow a user to select one or more business rules and one or more data points for a custom loss scenario rule;
      receiving user input related to the selection of the one or more business rules and one or more data points for the custom loss scenario rule;
      generating the custom loss scenario rule based on the user input; and
      transmitting the custom loss scenario rule to a primary claims analytics processor for implementation into a production data flow process, the custom loss scenario rule generated by the front-end processor enhancing speed of data analytics carried out by the primary claims analytics processor.

12. The method of claim 11, comprising the step of retrieving by the primary claims analytics processor the claims data from the database.

13. The method of claim 12, comprising the step of determining by the primary claims analytics processor a propensity score for the claims data.

14. The method of claim 13, comprising the step of identifying by the primary claims analytics processor one or more existing business rules triggered by the claims data.

15. The method of claim 14, comprising the step of retrieving by the front-end processor the propensity score for the claims data and the one or more identified existing business rules triggered by the claims data from the primary claims analytics processor.

16. The method of claim 15, comprising the step of displaying by the front-end processor the propensity score for the claims data and the one or more identified existing business rules triggered by the claims data in the front-end user interface.

17. The method of claim 16, wherein the custom loss scenario rule includes one or more of the identified existing business rules triggered by the claims data.

18. The method of claim 11, wherein the production data flow process comprises the step of applying one or more fraud detection algorithms to detect one or more fraud patterns in the claims data.

19. The method of claim 12, wherein implementation of the custom loss scenario rule into the production data flow process causes the detection of the one or more fraud patterns to be altered.

20. The method of claim 11, wherein the front-end user interface includes a plurality of user elements configured to allow the user to modify a saved custom loss scenario rule.

* * * * *